Patented May 1, 1934

1,956,965

UNITED STATES PATENT OFFICE 1,956,965

METHOD AND COMPOSITION FOR COATING RUBBER

Sherman I. Strickhouser, Jackson Heights, N. Y., assignor to The Naugatuck Chemical Company, Naugatuck, Conn., a corporation of Connecticut No Drawing. Application July 28, 1927, Serial No. 209,188

28 Claims. (Cl. 134—56)

This invention relates to an improved coating composition and method of making, and more particularly to a paint, varnish, linoleum, etc., composition containing drying oils and having improved drying qualities.

The driers ordinarily used in paints and varnishes, that is, heavy metal drier compounds, have been resinates or linoleates of lead, manganese, cobalt, etc. These driers are defective in that while they accelerate the rate of drying, the increase is not sufficient for many purposes, and in addition, in many cases they not only accelerate the drying, but by reason of continued action they cause a rapid aging and deterioration of the dried coating composition. Varnishes containing the mentioned driers are also used in connection with the manufacture of some articles of rubber, balata, etc., exemplified later herein by golf balls, rubber shoes, hand baggage, etc. and an objection to the driers used for this purpose has been that they appear to become deactivated when in contact with the rubber article, which action may be caused by the sulphur or by the accelerator used or reaction products of the accelerator.

An object of the present invention is to provide a coating composition with improved drying properties. Another object is to provide a coating composition the drying qualities of which will not be unfavorably affected when in contact with vulcanized or vulcanizable articles. Another object is to provide a method of making the composition. Further objects will appear from the detailed description and claims.

The invention comprises broadly a coating composition containing a drying oil and an organic peroxide. It also includes the method of making the composition.

In a specific application of the invention, a suitable varnish is formed containing the usual ingredients such as linseed oil, a suitable resin or resins and a thinning agent such as turpentine, and to this varnish an organic peroxide such as benzoyl peroxide is added in any suitable manner. One method of combining the materials is to form a concentrated solution of the peroxide in a solvent such as benzol and then add the solution to the varnish. Other drying oils can be substituted for the linseed oil, such as Perilla oil, soya, poppy seed or China wood oil, also fish oils if desired, such as Manhaden and Japanese fish oil. In place of the turpentine, other thinning agents such as solvent naphtha can be used. Suitable resins are Copal, amber, anime, Kauri and Dammar. In place of benzol, other solvents can be used for the peroxide, such as acetone, toluol, xylol, etc. For example, a concentrated solution of benzoyl peroxide in benzol added to varnish in the proportion of two parts by weight to 100 parts by weight of varnish effects a rapid drying of the composition, the drier being merely thoroughly stirred into the varnish before using. Such a varnish when applied to the surface of an article will dry at a considerably accelerated rate. Instead of adding the benzoyl peroxide in solution, it may be added directly as such to the varnish. In another method of using the drier an aqueous emulsion of a benzol solution of the peroxide can be prepared. The article, such as those herein mentioned, to which the varnish is to be applied can then be coated with the emulsion, as by dipping it in the latter and drying, after which the varnish is applied to the article. As another manner of application, the article to be coated can be dipped in or otherwise coated with a solution of the peroxide and the varnish later applied thereto. The peroxide can not only be added to a varnish containing no other drier, but it can also be effectively used in connection with ordinary commercial varnishes, such as Valspar, in which a drier of the ordinary type, such as the metal-containing driers referred to, has already been incorporated.

As further illustrations of the invention, either acetyl peroxide or phthalyl peroxide may be used as the drier. A varnish containing no drier may be treated with 2-4% by weight of acetyl peroxide dissolved in benzol. The varnish thus prepared will dry at an accelerated rate when applied to the surface of an article. The same is true of phthalyl peroxide when added to a varnish containing no drier in amounts of 2-4% on the weight of the varnish.

It is contemplated to use the varnish prepared as above described for varnishing any article the appearance of the surface of which it is desired to improve. Articles formed of rubber or rubber like material can be coated therewith, for example golf balls, rubber shoes, hand baggage, druggist's sundries, etc. When used for coating golf balls, it may be applied by dipping the vulcanized golf ball into a solution or emulsion of the peroxide, afterward coating the dipped golf ball with a varnish of the kind described herein. As applied to use in coating rubber shoes, the peroxide can be mixed into the varnish ordinarily used which preferably contains sulphur, after which the varnish is applied to the shoe and the varnished article is subjected to vulcanization.

The drier is of advantage also for use in accelerating the drying of other liquid coating compositions such as paints. The paints will contain one or more of the drying oils previously enumerated together with a thinning agent and one or more inorganic fillers. Suitable fillers which may be used are white lead, zinc oxide, titanium oxide, barium sulphate, lithopone, etc.

An advantage of the drying composition of the present invention is that the drier is readily decomposable and decomposes during its drying action. With the driers previously used, the action of the drier is maintained indefinitely, with the result that accelerated aging and deterioration occurs. The invention described herein is particularly applicable for use in the varnishes employed on golf balls which as stated above contain heavy metal drier compounds and provides a means of avoiding the deactivation as mentioned above of the heavy metal drier compounds by sulphur. In certain cases the composition or compositions employed in the ball contain accelerators of the carbon disulphide type, and driers of the type previously used appear to become deactivated when in contact with such accelerators. The drier of the present invention is not injuriously affected by sulphur or carbon disulphide accelerators and therefore the varnish film will dry satisfactorily on golf balls containing such accelerators.

Having thus described my invention, what I claim and desire to protect by Letters Patent is:

1. A method of varnishing rubber-like articles containing sulphur-containing vulcanizing ingredients which comprises applying thereto an acyl peroxide and a varnish containing a drying oil and a heavy metal drier compound.

2. A method of varnishing rubber-like articles containing sulphur-containing vulcanizing ingredients which comprises applying thereto benzoyl peroxide and a varnish containing a drying oil and a heavy metal drier compound.

3. As a varnish composition for rubber-like articles that contain sulphur-containing vulcanizing ingredients a drying oil varnish having as constituents thereof an acyl peroxide and a heavy metal drier compound.

4. As a varnish composition for rubber-like articles that contain sulphur-containing vulcanizing ingredients a drying oil varnish having as constituents thereof benzoyl peroxide and a heavy metal drier compound.

5. A method of varnishing rubber-like articles containing sulphur-containing vulcanizing ingredients which comprises applying thereto an acyl peroxide and then subsequently applying a varnish containing a heavy metal drier compound, and drying.

6. A method of varnishing rubber-like articles containing sulphur-containing vulcanizing ingredients which comprises applying thereto benzoyl peroxide and then subsequently applying a varnish containing a heavy metal drier compound, and drying.

7. A method of varnishing golf balls which comprises applying to the vulcanized ball the cover of which has been associated with sulphur-containing vulcanizing ingredients, an acyl peroxide and a varnish containing a drying oil and a heavy metal drier compound.

8. A method of varnishing golf balls which comprises applying to the vulcanized ball the cover of which has been associated with sulphur-containing vulcanizing ingredients, benzoyl peroxide and a varnish containing a drying oil and a heavy metal drier compound.

9. A method of varnishing golf balls which comprises applying to the vulcanized ball the cover of which has been associated with sulphur-containing vulcanizing ingredients, an acyl peroxide and then subsequently applying a varnish containing a drying oil and a heavy metal drier compound, and drying.

10. A method of varnishing golf balls which comprises applying to the vulcanized ball the cover of which has been associated with sulphur-containing vulcanizing ingredients, benzoyl peroxide and then subsequently applying a varnish containing a drying oil and a heavy metal drier compound, and drying.

11. A method of coating rubber and rubber-like articles in which the rubber-like material has been associated with sulphur-containing vulcanizing ingredients which comprises painting the surface with an acyl peroxide, a drying oil, and a heavy metal drier.

12. A method of coating rubber and rubber-like articles in which the rubber-like material has been associated with sulphur-containing vulcanizing ingredients which comprises painting the surface with benzoyl peroxide, a drying oil and a heavy metal drier.

13. A method of coating golf balls the cover of which has been associated with sulphur-containing vulcanizing ingredients which comprises painting the surface with an acyl peroxide, a drying oil, and a heavy metal drier.

14. A method of coating golf balls the cover of which has been associated with sulphur-containing vulcanizing ingredients which comprises painting the surface with benzoyl peroxide, a drying oil, and a heavy metal drier.

15. A method of varnishing rubber-like articles containing sulphur-containing vulcanizing ingredients which comprises applying thereto an acyl peroxide and a varnish containing a drying oil.

16. A method of varnishing rubber-like articles containing sulphur-containing vulcanizing ingredients which comprises applying thereto benzoyl peroxide and a varnish containing a drying oil.

17. As a varnish composition for rubber-like articles that contain sulphur-containing vulcanizing ingredients, a drying oil varnish having as a constituent thereof an acyl peroxide.

18. As a varnish composition for rubber-like articles that contain sulphur-containing vulcanizing ingredients a drying oil varnish having as a constituent thereof benzoyl peroxide.

19. A method of varnishing rubber-like articles containing sulphur-containing vulcanizing ingredients which comprises applying thereto an acyl peroxide and then subsequently applying a varnish and drying.

20. A method of varnishing rubber-like articles containing sulphur-containing vulcanizing ingredients which comprises applying thereto benzoyl peroxide and then subsequently applying a varnish and drying.

21. A method of varnishing golf balls which comprises applying to the vulcanized ball the cover of which has been associated with sulphur-containing vulcanizing ingredients, an acyl peroxide and a varnish containing a drying oil.

22. A method of varnishing golf balls which comprises applying to the vulcanized ball the cover of which has been associated with sulphur-containing vulcanizing ingredients, benzoyl peroxide and a varnish containing a drying oil.

23. A method of varnishing golf balls which comprises applying to the vulcanized ball the cover of which has been associated with sulphur-containing vulcanizing ingredients, an acyl peroxide and then subsequently applying a varnish containing a drying oil and drying.

24. A method of varnishing golf balls which comprises applying to the vulcanized ball the cover of which has been associated with sulphur-containing vulcanizing ingredients, benzoyl peroxide and then subsequently applying a varnish containing a drying oil and drying.

25. A method of coating rubber and rubber-like articles in which the rubber-like material has been associated with sulphur-containing vulcanizing ingredients which comprises painting the surface with an acyl peroxide and a drying oil.

26. A method of coating rubber and rubber-like articles in which the rubber-like material has been associated with sulphur-containing vulcanizing ingredients which comprises painting the surface with benzoyl peroxide and a drying oil.

27. A method of coating golf balls the cover of which has been associated with sulphur-containing vulcanizing ingredients which comprises painting the surface with an acyl peroxide and a drying oil.

28. A method of coating golf balls the cover of which has been associated with sulphur-containing vulcanizing ingredients which comprises painting the surface with benzoyl peroxide and a drying oil.

SHERMAN I. STRICKHOUSER.